United States Patent [19]

Soderstrom

[11] 4,106,872

[45] Aug. 15, 1978

[54] CLOUD ALTITUDE MEASURING APPARATUS AND METHOD

[75] Inventor: Sven-Erik Soderstrom, Vesteras, Sweden

[73] Assignee: ASEA Aktiebolag, Vesteras, Sweden

[21] Appl. No.: 776,063

[22] Filed: Mar. 9, 1977

[51] Int. Cl.² .............................................. G01C 3/08
[52] U.S. Cl. .................................. 356/4; 343/5 SM; 356/5
[58] Field of Search ............... 356/1, 4, 5; 343/5 SM, 343/7 AG; 330/86

[56] References Cited

U.S. PATENT DOCUMENTS 3,666,367  5/1972  Farnsworth et al. .................... 356/5

Primary Examiner—S. C. Buczinski
Attorney, Agent, or Firm—Watson, Cole, Grindle & Watson

[57] ABSTRACT

In cloud measuring apparatus a transmitter emits light pulses towards the cloud in a receiver located adjacent the transmitter and detects light reflected from the cloud, the receiver having a sensitivity that with increasing distance from the receiver first decreases to a certain distance and at greater distances from the certain distance the sensitivity increases.

2 Claims, 5 Drawing Figures

CLOUD ALTITUDE MEASURING APPARATUS AND METHOD

BACKGROUND OF THE INVENTION

The present invention relates to method and apparatus for measuring cloud altitude, and particularly to such means in which the sensitivity of a receiver for detecting echo signals from the clouds is controlled to adjust the receiver for the detection of only clouds, not haze, etc.

A device which is particularly suitable for measuring the cloud altitude is known from U.S. Pat. No. 3,741,655. The known device comprises measuring equipment of the optical radar type, which means that a transmitter emits short light pulses directed towards an object. In this case the object is a cloud, and when such light pulses hit the cloud reflexes occur, and part of the reflected light is intercepted by a receiver located adjacent to the transmitter. The time required for the light to travel the distance, transmitter-cloud-receiver, is measured and the altitude of the cloud is determined with the known velocity of light as the starting point. The known device according to U.S. Pat. No. 3,741,655 further comprises two integrating devices in the receiver unit, which are alternately caused to receive signals intercepted by the receiver. One of the integrating devices is designed to receive echo signals expected to be emitted from clouds, and the other integrating device is designed to receive only noise signals. After a number of light pulses have been emitted and echo signals have been received, the contents of the integrating devices are compared, and the result of the comparison is placed in proportion to a predetermined signal level and, if this level is exceeded the existence of clouds is indicated.

In this kind of cloud altitude measuring a well-adjusted sensitivity control of the receiver is necessary in order that precipitation and haze shall not be detected as a cloud and give rise to incorrect information as to the height of the cloud base. It is normal in this connection to let the sensitivity of the receiver increase, in accordance with a given function, with the distance from the receiver from which an echo signal is expected.

When the transmitter and the receiver, as in the above example, are placed adjacent to each other, this causes the area nearest the device to become less sensitive to the device, and echo signals with very low level are received from that area.

In the accompanying drawing, FIG. 1 illustrates the above problem. The letter S designates the transmitter, S1 and S2 the limits of the transmitter beam, M the receiver and M1 and M2 the limits of the field of view of the receiver. The boundaries S1, S2 and M1 and M2 show only an ideal condition. Within the transmitter beam and the field of view of the receiver there is in practice a distribution of the intensity, which diminishes to the sides of the beam. From the area A, the receiver only receives signals of a very low signal level, which is due to the fact that such low level signals lie outside the real field of view of the receiver. It is possible, therefore, that echo signals from clouds located at a very low height will not be indicated. FIG. 2 shows the section 1—1 of FIG. 1, where the area D shows the part of the transmitter beam which, in section 1—1, lies within the field of view of the receiver.

SUMMARY OF THE INVENTION

By means of a device according to the present invention, it is ensured that the sensitivity of the receiver is adjusted for detection of clouds only, but not haze, etc., in particular within the less sensitive areas of the transmitter beam mentioned above.

A sensitivity function is derived for controlling the sensitivity of a receiver responsive to reflective echoes of a transmitted beam impinging on clouds. The sensitivity function takes into consideration the factors of the less sensitivity area of the measuring range of the measuring equipment. Emitter circuitry 10, receiver 14, control unit 19 and level-sensor 28 of FIG. 2 of U.S. Pat. No. 3,741,655 are modified to include pulse counter, digital memory and D/A convertor circuitry for adjusting the threshold value in the level-sensing unit 26 of the aforementioned circuitry of the patent.

In a modified embodiment, the output of the digital/analog convertor is inverted and used to control receiver 16 in the circuitry of FIG. 2 of the aforementioned patent.

BRIEF DESCRIPTION OF THE FIGURES

The apparatus and method of the invention are described herein with reference to the accompanying drawings wherein.

DETAILED DESCRIPTION

Figure 1:
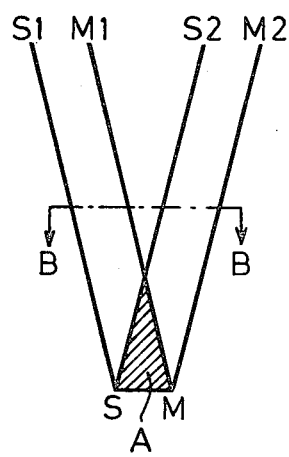
FIG. 1 is a diagrammatic representation of the limits of the transmitter beam and the field of view of the receiver and illustrating a low signal level area.

In order to detect only clouds at the beginning of the measuring range, the less sensitive area A of FIG. 1 is considered in the functional relationship which controls the sensitivity of the receiver. The sensitivity function can then in principle be expressed as $$K/K_{max} = C \cdot 1/A_h \cdot 1/T_h \cdot (h/h_{max})^2 \qquad (1)$$

where $K$ is the sensitivity of the receiver and $K_{max}$ its maximum sensitivity, $C$ is a constant, $T_h$ is the transmission factor of the atmosphere, $h$ is the height above the ground and $h_{max}$ is the maximum measuring height. $T_h$ can be expressed as $$e^{-\sigma 2h} \qquad (2)$$

where $2 < \sigma < 4$.

$A_h$ in equation (1) is a complex function of the height $h$ and the intensity distribution of the transmitter beam, the directional characteristics of the receiver, the angular distribution of the reflected light, and the distance between the transmitter and the receiver and is well known to those skilled in the art.

Figure 3:
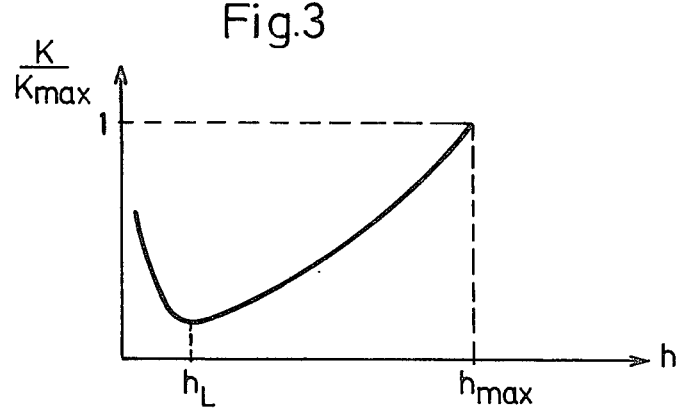
FIG. 3 is a graph showing the sensitivity variation of the receiver relative to the height above ground.

A graph of the function according to equation (1) is shown in FIG. 3. At the lowermost part of the measuring range the influence of the less sensitive area A of FIG. 1 is predominant. That influence decreases with increasing height and results in an increasing sensitivity up to the height $h_L$, where the damping in the atmosphere and the sensitivity, which decreases quadratically with the distance, become predominant and the sensitivity thus decreases in a known manner to the maximum height $h_{max}$. Both $h_L$ and $h_{max}$ are dependent on quantities which are characteristic of each type of measuring equipment, the quantities being determined by the geometrical and electrical properties stated above.

The disclosure of U.S. Pat. No. 3,741,655, assigned to the same Assignee as the subject application, is incorporated herein by reference. FIG. 1 of the aforementioned patent shown an emitter unit for emitting a number of known pulses which are arranged to reach a target at a known distance. The pulses are reflected from the target and supplied to a receiver unit. Emitter unit 10, receiver 14, control unit 19 and sensor 28 of FIG. 2 of the aforementioned patent are illustrated in FIG. 4A. The following description is taken from Column 1, line 64, to Column 2, line 47, of the aforementioned U.S. patent. The reflected pulses 13 are supplied to a detector 15, the output signal of which is amplified by an amplifier 16 and then provided to two separate gates 17 and 18. Gates 17 and 18 are controlled in time by means of control unit 19 connected to emitter 10. Control unit 19 comprises three impulse devices 20, 21 and 22 operating with time delays $T_1$, $T_2$ and $T_3$, respectively, and with impulse widths $t_1$, $t_2$ and $t_3$, respectively. $T_1$, $T_2$, $T_3$ are the times at which impulses of durations $t_1$, $t_2$, $t_3$ are transmitted to gates 17 and 18 and level sensing unit 26, respectively. Times $T_1$, $T_2$, $T_3$ are measured from the instant when a pulse 11 has been emitted from emitter 10. Emitter 10 is connected through impulse devices 20 and 21 to gates 17 and 18 respectively. The time delay $T_1$ of the impulse device is of such duration that gate 18 is only open when the reflected pulses 13 or parts of them are expected. The time delay $T_2$ of the impulse device 21 is of such a duration that gate 18 is opened at that instant when gate 17 is closed, suitably a certain time prior to that instant, that is, $T_2 = t_2 < T_1$, and of substantially the same duration, that is, $t_2 \approx t_1$. This means that gate 18 is opended at a certain time $T_2$ after the pulses 11 have been emitted and remains open for the duration of $t_2$. Thus only noise signals are received and supplied to an integrating unit 24, the in-coming noise signals being integrated during time $t_2$. At the time $T_1 > T_2 + t_2$ after the pulses 11 have been emitted, gate 17 is opened for a time interval $t_1$, whereupon the expected signal or a part of it is received together with said noise signal and supplied to an integrating unit 23 where it is integrated for a time interval $t_1$. The contents of the two integrating units 23 and 24 are provided to comparison unit 25 which compares the contents of the two integrators by producing, for example, a ratio or a difference between the signals entering unit 25. If it is assumed that unit 25 produces a difference such that an output signal is obtained from unit 25 as soon as there is a difference between the incoming signals, the output signal from unit 25 is supplied to a level-sensing unit 26. The connection between units 25 and 26 is controlled by means of impulse device 22 which is included in control unit 19. Level-sensing unit 26 is made operable after a suitable period $T_3 >> T_1 + T_2$, that is, after a substantial number of measurements have been performed. If a preset level for unit 26 is exceeded as a result of the contents of the signal from unit 25, a signal has been obtained by the detector. Output signal from level-sensing unit 26 may be connected to a suitable indicating device.

Figure 2:
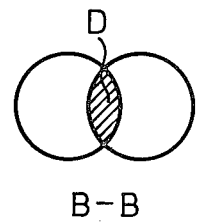
FIG. 2 is a section taken through lines 1—1 of FIG. 1.

Pulse counter 30, digital memory 31 and D/A convertor 32 in FIG. 4A represent the modification of the aforedescribed circuit of FIG. 2 of U.S. Pat. No. 3,741,655, such that the threshold level (sensitivity) of level-sensing unit 26 may be adjusted. In the embodiment of FIG. 4A, the sensitivity adjustment is carried out at level-sensing device 26. For each measuring distance emitter unit 10 emits a pulse train. Simultaneously with the emission of emitted pulses 11, control pulses are input to impulse devices 20, 21 and 22, operating with time delays $T_1$, $T_2$, $T_3$. Time delay $T_3$ is longer than the complete pulse train 11, such that a signal appears on the output of impulse device 22 immediately after the last pulse within pulse train 11. The signal output from impulse device 22 is input to pulse counter 30, the output of which is input to digital memory 31, and the memory output is input to digital-to-analog (D/A) convertor 32. The output of D/A convertor 32 is connected to level-sensing unit 26 for regulating the threshold level therein in a manner well known to those skilled in the art to which the invention is directed.

The cloud altitude measuring is preferably carried out in steps of, for example, five meters. For each step, a new pulse is input to pulse counter 30. Memory 31 contains the function $K/K_{max}$ (Equation 1) and therefore its output is defined by that function. The analog output signal from D/A convertor 32 to level-sensing unit 26 is illustrated in FIG. 4B. FIG. 4B represents the threshold value of level-sensing unit 26 that must be exceeded by the signal from comparison unit 25 before an output signal appears at the output of level-sensing unit 26. For a distance $h_L$, the threshold value is at its maximum, and from FIG. 3 it is evident that the sensitivity is at its minimum value.

Figure 4:
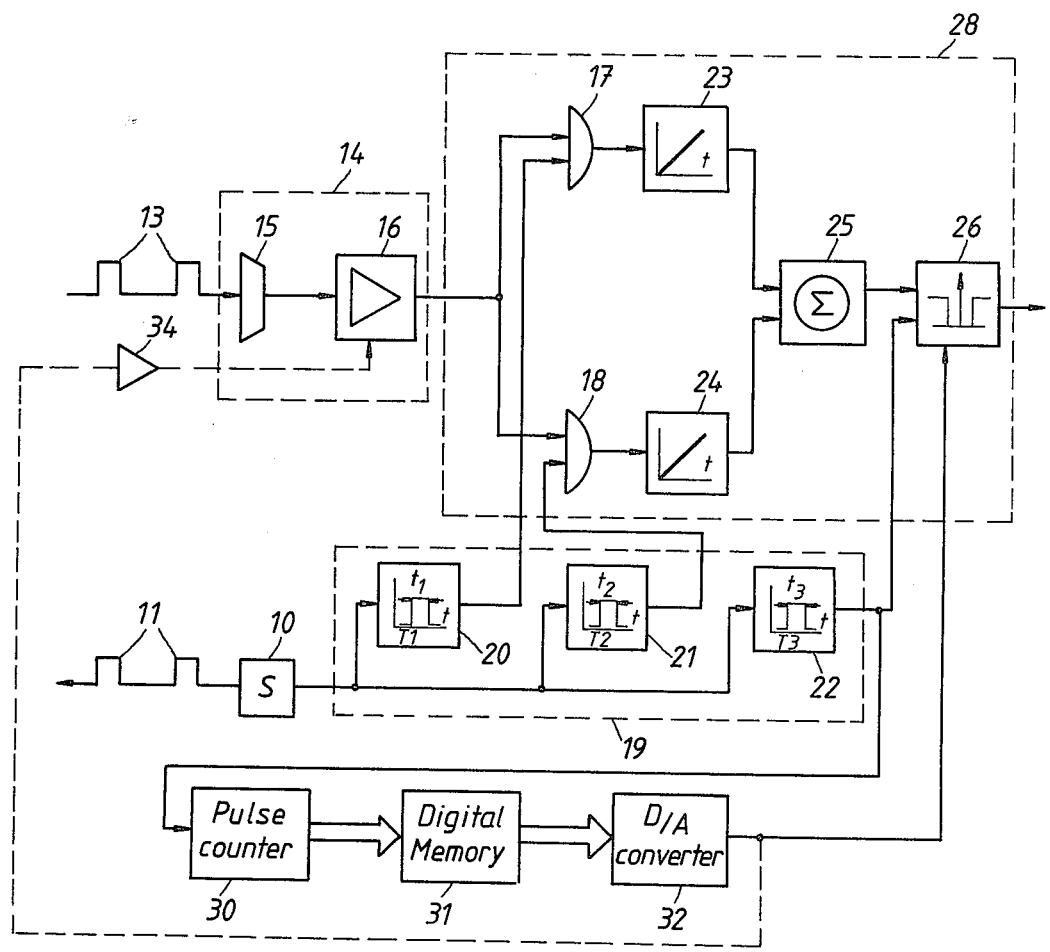
FIG. 4A illustrates an embodiment for carrying out the invention which represents a modification of FIG. 2 of U.S. Pat. No. 3,741,655.
FIG. 4B is a graph illustrating the relationship of the threshold level in level sensing unit 26 of FIG. 4A with respect to distances $h$ representing height above ground.
Figure 4:
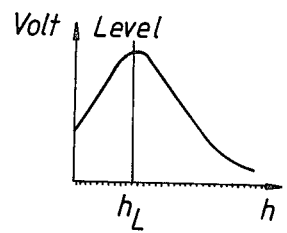

In a modified embodiment, the output of D/A convertor 32 is inverted by inverter 34 and applied to control the amplification of amplifier 16 in receiver unit 27, as indicated by the dotted line in FIG. 4.

What is claimed is:

1. Means for measuring cloud altitude, comprising a transmitter for emitting light pulses towards a cloud, a receiver located adjacent the transmitter for detecting light reflected from the cloud, said receiver having a sensitivity, said sensitivity with increasing distance from the receiver, first decreases to a certain distance, and at greater distances from said certain distance said sensitivity increases, and said sensitivity is determined from the function:

$$K/K_{max} = C \cdot 1/A_h \cdot 1/T_h (h/h_{max})^2$$

where
$K$ is the sensitivity of the receiver, $K_{max}$ is the maximum sensitivity of the receiver, $C$ is a constant, $A_h$ is a complex function of height, $T_h$ is an atmosphere transmission factor, $h$ is the height above ground, $h_{max}$ is the maximum measuring height.

2. A method for measuring cloud altitude, comprising the steps of:
   emitting light pulses towards the cloud from a transmitter;
   detecting light reflected from said cloud with a receiver located adjacent the transmitter;
   adjusting the sensitivity of said receiver whereby said sensitivity with increasing distance from the receiver, first decreases to a certain distance and at greater distances from said certain distance, said sensitivity increases, and said sensitivity is determined from the function $$K/K_{max} = C \cdot 1/A_h \cdot 1/T_h (h/h_{max})^2$$

where $K$ is the sensitivity of the receiver, $K_{max}$ is the maximum sensitivity of the receiver, $C$ is a constant, $A_h$ is a complex function of height, $T_h$ is an atmosphere transmission factor, $h$ is the height above ground, $h_{max}$ is the maximum measuring height.

* * * * *